United States Patent

[11] 3,586,440

| [72] | Inventor | Charles F. de Mey, II<br>West Redding, Conn. |
|---|---|---|
| [21] | Appl. No. | 679,011 |
| [22] | Filed | Oct. 30, 1967 |
| [45] | Patented | June 22, 1971 |
| [73] | Assignee | The Perkin-Elmer Corporation |

[54] VARIABLE RATE ANGULAR DRIVE MECHANISM FOR A DIFFRACTION GRATING
12 Claims, 5 Drawing Figs.

[52] U.S. Cl. ........................................... 356/74,
350/162
[51] Int. Cl. ........................................... G01j 3/06
[50] Field of Search .......................................... 74/54, 99;
350/162; 356/74—101

[56] References Cited
UNITED STATES PATENTS

| 3,020,794 | 2/1962 | Reichel | 356/96 |
| 3,229,563 | 1/1966 | De Mey | 350/162 |
| 3,367,231 | 2/1968 | Meinecke et al. | 356/98 |
| 3,414,356 | 12/1968 | Cary | 356/100 |
| 3,443,444 | 5/1969 | Frederick | 74/54 |

Primary Examiner—Ronald L. Wibert
Assistant Examiner—F. L. Evans
Attorney—Edward R. Hyde, Jr.

ABSTRACT: An optical dispersion element (e.g., a diffraction grating) is mounted on a scanning arm, pivoted on a first pivot pin carried by an auxiliary lever, which in turn is pivoted about a second fixed pivot pin. An (angled straight) edge of the scanning arm is cammed by a linearly moving driving pin so as to cause initially the scanning arm to pivot about the first, lever-carried pivot pin. A blocking mechanism inhibits rotative movement of the scanning arm relative to the auxiliary lever at a certain position, beyond which the scanning arm and the lever necessarily pivot conjointly about the second fixed pivot pin. The grating is therefore rotated at two different but related mathematical functions of the driving pin motion. A specific example obtains two different cosecant functions, thereby rotating a grating at two different angular rates (each of which is differently proportional to the wave number of the diffracted radiation leaving the grating in a fixed (in space) direction), thereby yielding a "scale change" during the grating rotative scanning.

PATENTED JUN 22 1971

INVENTOR.
Charles F. de Mey II
BY
Daniel W. Levinson
ATTORNEY

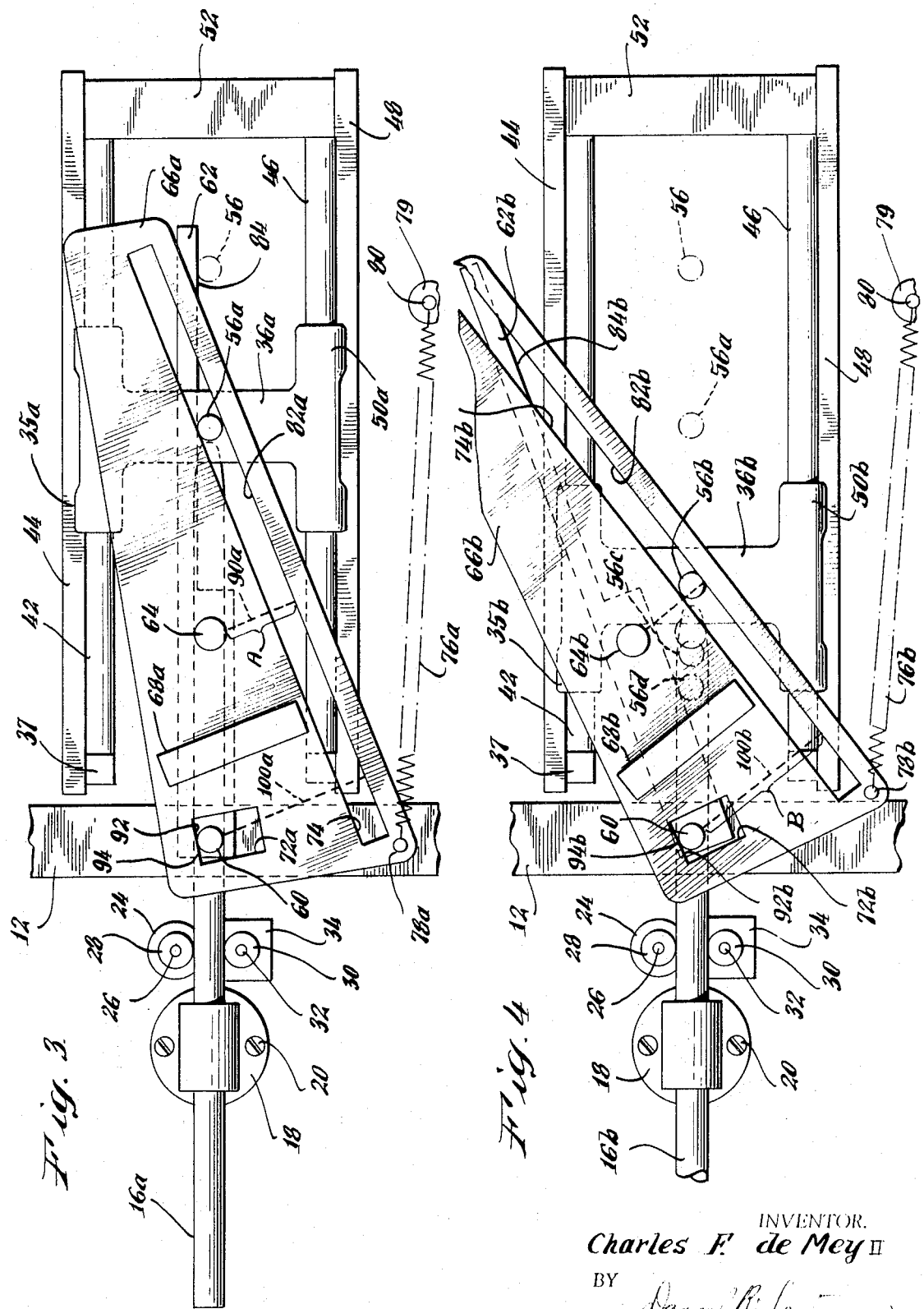

3,586,440

VARIABLE RATE ANGULAR DRIVE MECHANISM FOR A DIFFRACTION GRATING

INTRODUCTION

This invention relates to an angular drive mechanism for rotating a driven element at an angular rate first according to one particular function and then according to a second different, but mathematically related, function. The invention generally accomplishes this purpose by rotating a driven element initially about first pivot axis and then subsequently about a second different pivot axis.

Although the invention may be utilized to rotate various elements, it is particularly valuable for rotating optical elements, especially in dispersion systems (e.g., diffraction gratings) at least two different but related angular rates. As used for example to rotate a diffraction grating, the grating may be rotated so as to cause, for example, the frequency of the dispersed radiation leaving the exit slit of a monochromator to follow a first simple mathematical relationship (e.g., a straight line having a particular first slope) initially, and then to follow a second related mathematical relationship (e.g., a second line having a second different slope) relative to a driving element.

In the particular exemplary embodiment hereinafter described, the frequency (as measured in wave numbers) of the dispersed radiation is first a particular (linear) function of a linearly moving drive pin, and then a second different (linear) function of the same linear pin motion. As further explained in U.S. Letters Pat. No. 3,229,563, issued to the present inventor on Jan. 18, 1966, such a linearly proportional wave number generation may be obtained by rotating a diffraction grating as the arc-cosecant of the linearly moving pin. The exemplary embodiment of the invention causes the grating to be rotated at a first (cosecant) function to a particular point, and then at a second (cosecant) angular rotation rate of the grating beyond this point without the need for any additional motive mechanisms (i.e., involving further moving parts) to assist the changeover. As will be seen hereinafter, the invention accomplishes the above general and specific functions by effective rotating of the grating about a first pivot axis to the changeover point and subsequently rotating the grating about a different pivot axis thereafter. In the particular exemplary embodiment, the two grating movements may be expressed as: cosecant $G=X/A$ for the first function, and cosecant $G=X/B$ for the second function; where $G$ is the grating rotation angle, $X$ is the linear position of the driving pin, and $A$ and $B$ are two different constants, each of which is determined by the position of one of the two effective pivot axes.

An object of the invention is the provision of an angular drive for rotating an element according to two different but related mathematical functions.

A related object is the provision of such a two-rate angular drive which utilizes few precision parts and is therefore relatively inexpensive to make and simple to maintain.

A more specific object of the invention is the provision of such a two-rate angular drive capable of driving an optical dispersion element initially according to one cosecant function and subsequently according to a different cosecant function.

A further object of the invention is the provision of a two-rate angular drive for an optical element, in which the drive rate change occurs without the need for additional external moving mechanical parts, so that the drive itself accomplishes the rate changeover at the appropriate angular position of the optical element.

Other objects, features and advantages of the invention will become obvious to one skilled in the art upon reading the following detailed description of a preferred exemplary embodiment in conjunction with accompanying drawings in which:

FIG. 3 is a plan view of part of the same embodiment, but with the parts in the changeover position;

FIG. 4 is a plan view of the same parts, but with the parts advanced beyond the changeover position.

Figure 1:
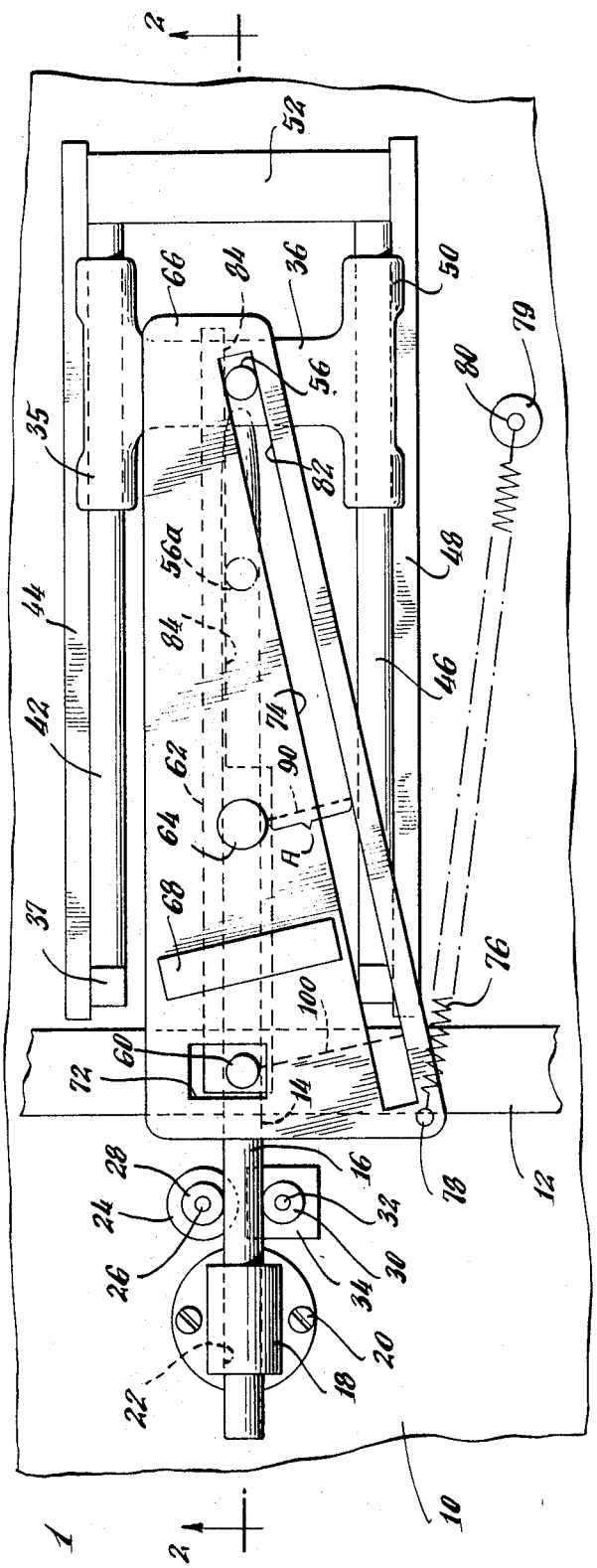
FIG. 1 is a plan view of an exemplary embodiment, with the parts in the starting position.
Figure 2:
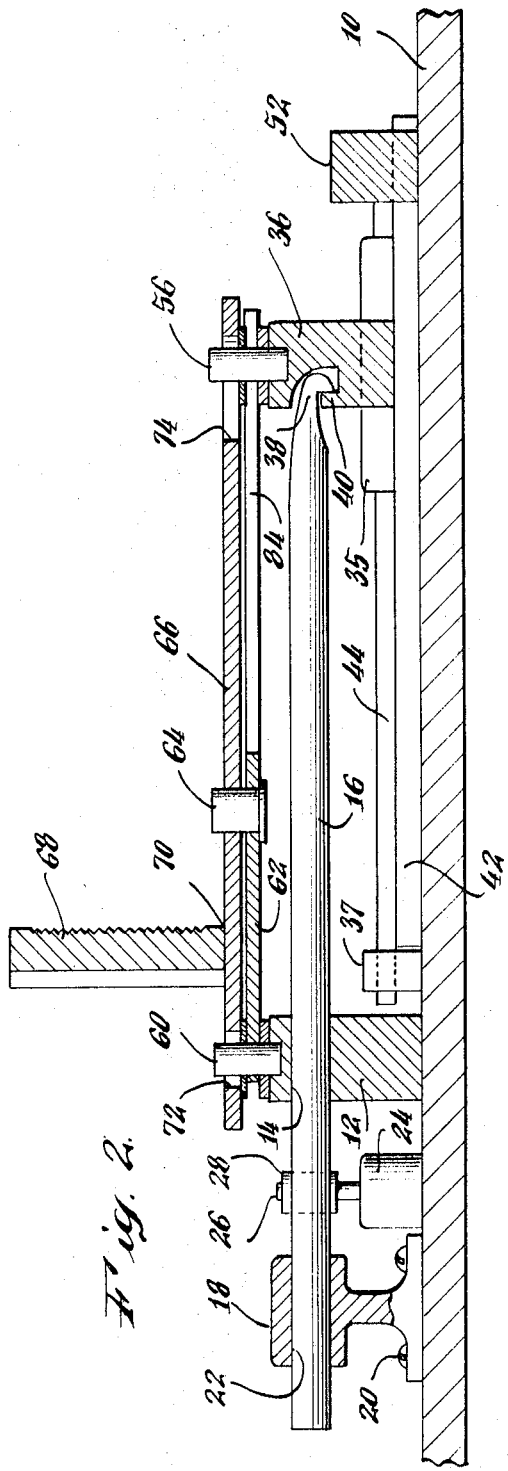
FIG. 2 is a vertical section of FIG. 1, taken along the line 2-2.

In FIGS. 1 and 2 an entire exemplary embodiment of the invention is illustrated in its starting position, in plan and central vertical section respectively. In these figures 10 represents a stationary frame member, and will be assumed to be the frame of the monochromator portion of an optical instrument (for example, a spectrophotometer). A generally vertical support or portion 12 is apertured as at 14 to slidably support a drive rod 16 (which may be, for example, square in cross section). An auxiliary supporting bracket 18 (secured to frame 10 as at 20) may provide additional support for drive rod 16, as at 22. A motor 24, which may be rigidly secured to frame 10, carries on its rotating output shaft 26 a drive roller 28 engaging one side of rod 16. A backup or idler roller 30 may be positioned on the opposite side of rod 16 by being rotatably mounted upon a stub shaft 32 supported by a block 34. The motor therefore linearly drives rod 16 in a horizontal direction in the figures by frictional engagement of its driving roller 28 (which may for example be of rubber).

The right-hand end of drive rod 16 may engage a slidable block or spider 36, as by a hook 38 and lug 40 formed on adjacent parts of the rod 16 and the spider 36, respectively (see FIG. 2). The spider 36 may be constrained to slide only in a horizontal direction by a pair of track members, each of which is composed of a horizontal portion 42, 46 and a vertical or edge portion 44, 48. Spider 36 preferably engages the tracks or channels (i.e., elements 42—48) at relatively wide-spaced points, and may include additional means (as overlying portions 50, keyway connections or the like) to inhibit movement of the spider 36 in any direction except linearly along the horizontal tracks. A bracing member 52 may be positioned near the right-hand end of the tracks (42—48) to brace them and to act as a positive stop in the possible movement of spider 36 toward the right. One or more blocks 37 may act as analogous stops for leftward movement of the spider (by engaging portion 35 thereof). Spider 36 rigidly holds a vertical driving pin 56. Because of the mechanisms so far described the driving pin 56 is constrained to move only along a horizontal line (in this case substantially along the midline of FIG. 1).

Support member 12 rigidly carries a first or main pivot pin 60, which rotatably supports a relatively thin, narrow and long lever 62. Lever 62 rigidly carries a second pivot pin 64 about which is rotatably mounted a generally triangular shaped main scanning arm 66. In the exemplary embodiment, scanning arm 66 directly carries the optical element 68 (assumed to be a diffraction grating of the reflecting type), for example, by being rigidly secured thereto at 70 (as by suitable cement). Scanning arm 66 has material removed in its upper left-hand corner so as to form a relatively small rectangular aperture 72 therein. In the position of parts shown in FIGS. 1 and 2, main pivot pin 60 freely passes through rectangular aperture 72. The centers of all three pins (56, 60, and 64) are on the same straight line in FIG. 1, and the driving pin is moved along this same (horizontal) line so as to remain centered thereon.

Scanning arm 66 also contains a very long, relatively narrow rectangular slot 74 near its lower edge. Driving pin 56 passes through this long slot 74; and scanning arm 66 is biased by a long strong spring 76 (connected to arm 66 as at 78 and to stationary frame 10 as at 79, 80). An internal cam edge 82, defining one side of slot 74 of the scanning arm 66, is therefore constantly biased against driving pin 56. Spring 76 not only biases scanning arm 66 about the second pivot pin 64 (in a counterclockwise direction), but also (because of the effective coupling of the scanning arm to lever 62 by pin 64) biases lever 62 in a generally clockwise direction about the first pivot pin 60. Lever 62 is inhibited from such clockwise motion by its long straight lower edge 84, which is parallel to the line through the centers of both pivot pins 60 and 64 (and therefore drive pin 56), bearing on the top of driving pin 56. Stated in other terms, (the opposite surfaces of) pin 56 inhibits the counterclockwise rotation of arm 66 about second pivot 64 and the clockwise rotation of lever 62 about first pivot pin 60, spring 76 tending to cause both such types of rotation because of the geometry of the compound lever system formed by elements 62 and 66 and their respective pivot pins 60 and 64.

The operation of the apparatus, so as to turn the optical element (i.e., grating 68) first at one (faster) and then at a second (slower) angular rate may best be seen by a comparison of FIG. 1 with FIG. 3, which shows the position of most of the same parts when the linearly moving pin 56 has reached a different later stage in its movement (to the left). Since all the parts in FIG. 3 are identical to those already described in reference to FIG. 1, the stationary parts bear the same reference numerals and are not described again. Despite the identity of the moving parts, those which have assumed different positions in FIG. 3 than in FIG. 1 are labeled with their original reference numeral followed by the letter $a$.

Referring momentarily back to FIG. 1 (which shows the parts substantially at the beginning of an operative cycle), motor 24 will rotate drive roller 28 (by means of shaft 26) so as to move drive rod 16 at a constant rate toward the left. Drive rod 16 therefore pulls the slidable block or spider 36 and the rigidly attached driving pin 56 in this same direction. Since lever 62 is effectively biased by spring 76 to tend to rotate clockwise about main pivot pin 60 and is inhibited from such rotation by the engagement of drive pin 56 with edge 84 of lever 62, the lever and its rigidly connected second pivot pin 64 do not move during this stage of the operation. As drive rod 16, slidable spider 36 and drive pin 56 move toward the left, scanning arm 66 is allowed to slowly rotate counterclockwise about its now effective pivot, the second pivot pin 64. Specifically the angled nature of the internal cam edge 82 of arm 66 allows such counterclockwise rotation of the arm in accordance with a cosecant function of the linear distance ($X_1$) between driving pin 56 and pivot 64 (forming the hypotenuse of a right triangle) and the perpendicular distance, A (indicated at 90) between pivot pin 64 and the cam edge 82 (A thereby forming the short leg of the same triangle).

Rigorously, if $X_1$ is measured between the center points of pins 56 and 64, then A should be measured between the center of pin 64 and the line (not shown) parallel to edge 82, but being closer to (i.e., generally above edge 82 in FIGS. 1 and 3) pin 64 by the radius of pin 56. If pins 56 and 64 are of the same radius (as shown), then A may also be considered as that part of line 90 lying between cam edge 82 and the nearest part (i.e., the outside surface) of pin 64; and it is so labeled in FIG. 3 and will, for convenience, be so considered.

Specifically the angular position of the scanning arm (as measured, for example by the angle, $S_1$, between straight internal cam edge 82 and the horizontal in FIG. 1) will vary according to the cosecant function determined by this linearly decreasing hypotenuse distance, $X_1$, between the (moving to the left) driving pin 56 and the stationary second pivot pin 64 divided by A (the constant opposite leg of the triangle). Thus: cosecant $S_1 = X_1/A$. Since in the specific embodiment the optic element 68 is rigidly attached to the scanning arm 66, it will also rotate through an angle, $G$, such that its cosecant will be equal to the quotient of the just mentioned changing hypotenuse and constant leg. Obviously this relationship will be true regardless of the exact original orientation of optical element 68 relative to arm 64 if $G$ is measured from an appropriate zero line. Merely for purposes of simpler illustration, assume that the normal to grating 68 is parallel to internal cam edge 82 and that therefore this normal will make an angle G to the horizontal in FIG. 1 which is equal to the cosecant function just described. Then: $G=S_1$; and: cosecant $G$=cosecant $S_1 = X_1/A$. It is again emphasized, however, that the angular movement of the scanning arm 66 and therefore of the optical element 68 (regardless of its relative orientation) will be a first cosecant function of the linearly moving driving pin 56, and that the specific orientation of grating 68 is merely exemplary.

During movement of the driving pin from its FIG. 1 to its FIG. 3 position (i.e., from 56 to 56$a$), the scanning arm has been moving according to the equation: cosecant $S_1 = X_1/A$, as $X_1$ decreases in value. It should be noted that the perpendicular distance from second pivot pin 64 to (the nearest part of) the internal cam edge 82 is always a constant length, A, even though this distance is referenced 90$a$ in FIG. 3 to show that its orientation in space has changed.

After the spider and its rigidly held driving pin have been pulled to the left by drive rod 16 to a certain distance, the situation shown in FIG. 3 is reached. Up until this point, the scanning arm has been free to turn about pivot pin 64 so as finally to reach the position indicated at 66$a$ in FIG. 3. During this rotation of the scanning arm, the rectangular slot 72 has of course also changed its position so as finally to reach the position indicated in FIG. 3 at 72$a$. At this rotation angle of the scanning arm, the upper edge 92 defining the rectangular aperture 72$a$ contacts the top of stationary main pin 60 at 94. Because of this, the scanning arm 66$a$ in FIG. 3 can no longer freely rotate counterclockwise about the second pivot pin 64. Since the lever 62 is pivotally connected at pin 60, this lever is always constrained against rotation except about pivot pin 60; the pivot connection at 64 between lever 62 and scanning arm 66$a$ always constrains the arm against rotation relative to the lever except about this second pin; and the now occurring abutment of aperture edge 92 and pin 60 now precludes any further rotation of scanning arm 60$a$ counterclockwise relative to lever 62 (about pivot pin 64). The only remaining possible motion of these parts during further motion of drive pin 56$a$ (leftward beyond the FIG. 3 position) is therefore a conjoint rotation of arm 66$a$ and lever 62 (counterclockwise) about main pivot pin 60. Since the long strong spring (which has assumed position 76$a$ in FIG. 3) continues to apply a counterclockwise torque to scanning arm 66$a$ (not only about pivot pin 64 but also about main pivot pin 60), further movement of the driving pin to the left from its position 56$a$ in FIG. 3 will actually result in this conjoint rotation of lever 62 and scanning arm 66$a$.

As the driving pin on the spider is moved by the drive rod further to the left than shown in FIG. 3, it will eventually reach a position indicated at 56$b$ in FIG. 4. The position of drive pin 56$b$ shown in FIG. 4 is chosen for purposes of illustration approximately as much farther to the left of the changeover position 56$a$ (see FIG. 3) as this changeover position 56$a$ is to the left of the starting position shown at 56 in FIG. 1. During the time that the drive rod, spider and drive pin are moving between the positions (16$a$, 36$a$, and 56$a$ respectively) shown in FIG. 3 to those (16$b$, 36$b$, and 56$b$, respectively) in FIG. 4, the scanning arm (conjointly with the lever) will be rotating about main pivot pin 60 through an angle defined by a different second cosecant function. Specifically the angle, $S_2$, (still measured between cam edge 82$b$ and the horizontal) will have its cosecant equal to the distance between the pin 56$b$ (any time it is to the left of the 56$a$ position) and the main pivot pin 60, $X_2$, divided by the constant perpendicular distance, B, between the nearest parts of pivot pin 60 and the internal cam edge 82, along the line shown in FIG. 4 at 100$b$ (and in FIG. 3 at 100$a$). B may be so measured if pins 60 and 56$b$ (i.e., 56) are the same diameter; otherwise B should be considered the actual distance between the center of pin 60 to the line (not shown) parallel to edge 82$b$ but closer to (i.e., above and to the left of edge 82$b$ in FIG. 4) pin 60. Regardless of the relative diameters of the pins (60, 56 and 64), this line defines the actual trigonometric relationships (for both legs A and B of the two triangles); and physical cam edge 82 (82$a$, 82$b$, etc.) is not only always parallel to this theoretical third side of the triangle, but is always the same fixed distance away (namely the radius of pin 56). Therefore once the position of pin 56 is known and cam edge is positioned one pin (56) radius below the desired location of the third side of the triangle defining the trigonometric relationships, the diameters of pins 60 and 64 no longer are relevant to the angular functions generated.

Thus: cosecant $G$=cosecant $S_2=X_2/B$. It might be noted that this distance (i.e., 100a or 100b) does not vary in length as long as the drive pin is at least as far to the left as shown in FIG. 3 at 56a.

As may best be seen in FIG. 4, the lever (shown as 62b) and therefore the second pivot (64b) will move out of the way of the drive pin even before it has reached the FIG. 4 position (at 56b). Thus the moving elements (the drive rod, spider and the drive pin) may continue considerably farther to the left than shown in FIG. 4. For example, the drive pin may move to the consecutive positions indicated in dotted lines at 56c and 56d in FIG. 4. The limiting practical position of the drive pin is reached (at about 56d) only when the drive pin is at a distance from pin 60 (measured from the pin centers) which approaches equality to the distance B. The cam edge 82b (and the parallel theoretical line defining the third side of the triangle) then approaches perpendicularity with the horizontal in FIG. 4 (the locus of the hypotenuse); and this "third" side of the triangle approaches zero in length, as the other leg (along line 100b as rotated) approaches equality with the hypotenuse. In addition to the theoretical problems in drive pin travel beyond (i.e., to the left of) position 56d, the mechanical constraint between cam edge 82b (as repositioned) and the drive pin will also be lost. Nevertheless, the fact that secondary pivot pin 64b moves out of the way yields a substantial increase in the useful range of the drive pin movement, as the drive pin may pass through the original location (shown dotted at 64 in FIG. 4) of this pivot pin all the way to about location 56d.

In summary of the operation, the initial drive pin (56) movement from the FIG. 1 starting position will cause only the scanning arm 66 to rotate about pivot pin 64 during the first stage (until the drive pin reaches the position 56a shown in FIG. 3); and the position of the scanning arm will be given by: cosecant $S_1=X_1/A$. At this changeover point, because of the engagement of upper edge 92 of the slot 72a in the scanning arm 66a with pin 60, both the lever 62 and the scanning arm 66a. will start to move conjointly counterclockwise about pivot pin 60; and the scanning arm position is now given by: cosecant $S_2=X_2/B$. This conjoint rotation may continue not only to the position shown in FIG. 4 but substantially beyond this position, since both the lever and the pivot pin (at 62b and 64b respectively in FIG. 4) have moved out of the way of the approaching drive pin (as may be seen most clearly from FIG. 2, the drive rod 16 and the spider 36 pass below and are free of the path of any of the other elements). Abutment of the left-hand part (as at 35) of the spider 36 with a stopping block (37) insures that the parts do not overrun their useful range of movement.

It may be noted that at changeover (i.e., in the position of the parts shown in FIG. 3) between the first stage (when pivot pin 64 is the effective pivot axis of the scanning arm) to the second stage (when main pivot pin 60 becomes its effective pivot) that two similar triangles are formed. Specifically, the internal cam edge (82a) forms one leg of both triangles; the line joining the moving drive pin 56a and the main pivot pin 60 (which passes through the original position 64 of the second pivot pin) form the hypotenuses of these triangles; and each of the perpendicular distances 90a and 100a (i.e., A and B, respectively) form the remaining legs of the two triangles. It is therefore obvious that the cosecant functions generated during the first stage and during the second stage are directly related by the ratio between the two perpendicular distances, A and B (90a and 100a respectively), between the internal cam edge 82a and the two different respective pivots 64 and 60, respectively. In the illustrated exemplary embodiment (which is not to exact scale) the ratio of these two perpendicular distances $A$ to $B$ (i.e., 100a—90a) is approximately 1:2, respectively.

Mathematically represented, we may write for the first stage (i.e., for positions of the moving parts from FIG. 1 through FIG. 3 inclusive):

$$\text{cosecant } G = \text{cosecant } S_1 = X_1/A. \quad (1)$$

For the second stage positions of the parts (from FIG. 3 through FIG. 4 positions and beyond), we have:

$$\text{cosecant } G = \text{cosecant } S_2 = X_2/B. \quad (2)$$ At the changeover (FIG. 3) position:

$$\text{cosecant } G = \text{cosecant } S_1 = \text{cosecant } S_2; \quad (3) \text{ or:}$$

$$\text{cosecant } G = X_1/A = X_2/B. \quad (4)$$

As is now well known (see the above-referred to U.S. Pat. No. 3,229,563) the frequency (expressed, say, in wave numbers), $F_{wn}$, of the radiation diffracted in a fixed direction from an adjustably mounted (i.e., rotatable) diffraction grating is directly proportional to the cosecant of the grating angle, $G^1$, as measured between, say, the grating normal and the fixed incident ray direction.

We may therefore write:

$$\text{cosecant } G^1 = K\, F_{wn}. \quad (5)$$

By appropriate choice of the grating orientation relative to the scanning arm (or more generally by choosing the "correct" reference direction from which we measure the actual grating angle, $G$), we may equate the optically meaningful grating angle, $G^1$, and the previously defined, geometrically measured grating angle, $G$. We then obtain the following first-stage equation (FIG. 1 through FIG. 3 movement) from equations (1) and (5):

$$KF_{wn} = \text{cosec } G^1 = \text{cosec } G = \text{cosec } S_1 = X_1/A. \quad (6)$$

For the second stage (FIG. 3 through FIG. 4 movement and beyond), from equations (2) and (5) we obtain:

$$KF_{wn} = \text{cosec } G^1 = \text{cosec } G = \text{cosec } S_2 = X_2/B. \quad (7)$$

At changeover (the FIG. 3 position), from equations (3), (4) and (5), we have:

$$KF_{wn} = \text{cosec } G^1 = \text{cosec } G, \quad (8a)$$

$$= \text{cosec } S_1 = \text{cosec } S_2, \quad (8b)$$

$$= X_1/A = X_2/B. \quad (8c)$$

Figure 5:
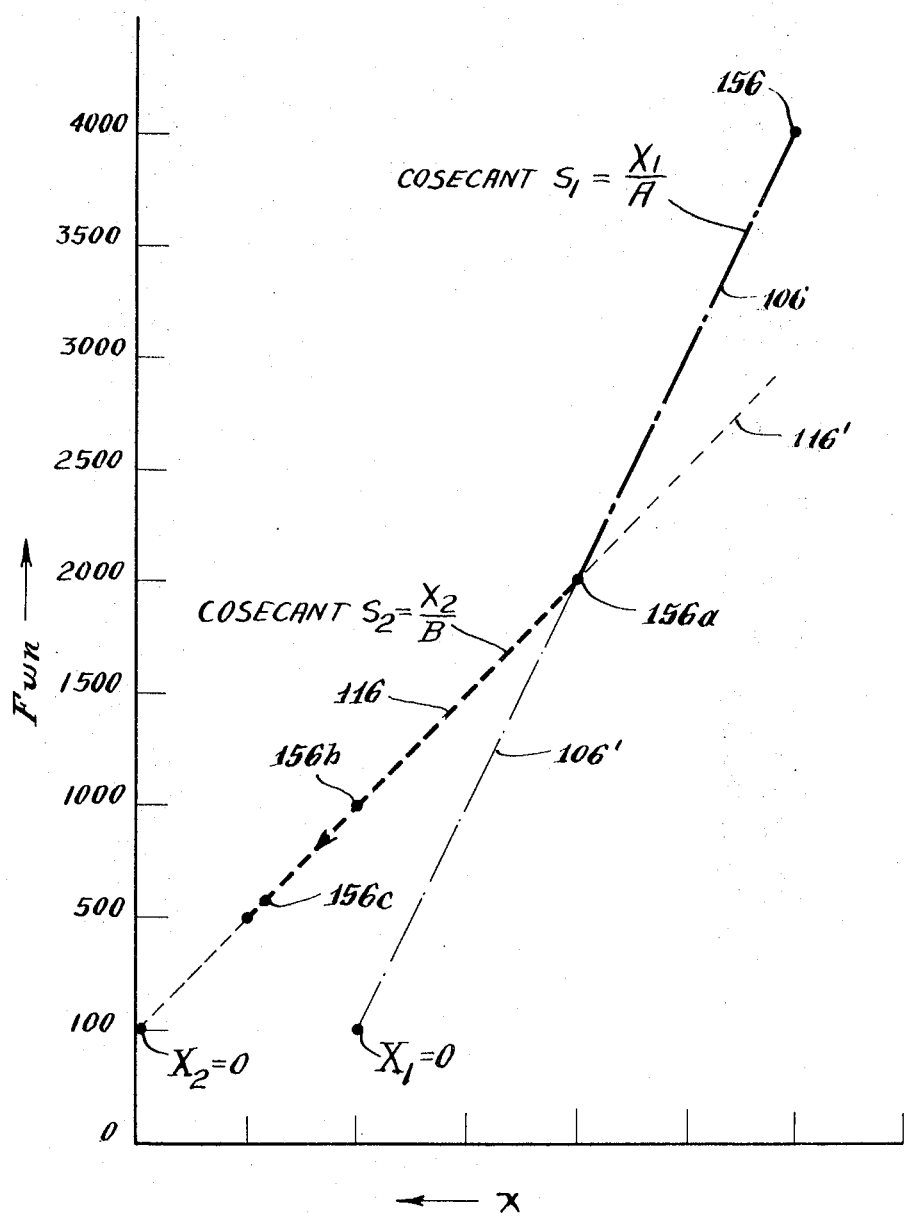
FIG. 5 is a graphical representation of how the frequency of radiation (as measured in wave numbers) diffracted by the grating will vary relative to the position of the linearly moving drive pin (56).

A graphical illustration of a particular version of the invention (which has actually been built) in which the ratios of the perpendicular distances $(B:A)$ was exactly 2:1 is given in FIG. 5. The abscissa of the FIG. 5 graph indicates the pin position, $x$ (assumed to be moving from right to left), while the ordinate of the FIG. 5 graph is the frequency $(F_{wn})$ of radiation diffracted from a (reflection) grating (directly carried by the scanning arm) as given in wave numbers. When the driving pin is in the starting position indicated at 56 in FIG. 1, radiation having a frequency of 4000 wave numbers, expressed as reciprocal centimeters (abbreviated as cm $^{11}$) will be diffracted from the grating in a particular fixed direction (corresponding to the exit slit of the monochromator); this situation is graphically indicated by point 156 in FIG. 5. As the drive pin linearly moves from the position 56 in FIG. 1 toward the position 56a in FIG. 3, the frequency of the radiation leaving the diffraction grating at the same fixed (in space) direction (to the fixed exit slit) will linearly vary along the line 106 in FIG. 5, until the point 156a (corresponding to the FIG. 3 position 56a of the drive pin) is reached. This linear relationship conforms to equation (6) as previously explained. During this first-stage drive pin movement, the frequency (expressed in wave numbers) of the radiation reaching the monochromator exit slit will have linearly decreased from 4000 to 2000 cm$^{11}$ along line 106 (FIG. 5).

If there were no change in the effective pivot axis at the time the driving pin reaches position 56a in FIG. 3, the grating would of course continue to be rotated by the same cosecant function so as to cause the wave numbers of the diffracted radiation to fall along the dotted line indicated at 106' in FIG. 5. Because of the change in effective pivot axis which actually occurs, the movement of the driving pin between the positions of 56a (see FIG 3) toward 56b (see FIG. 4) will cause the wave number of the diffracted radiation to follow the second straight line 116 of FIG. 5 in accordance with equation (7). When the driving pin moves an equal linear distance between points 56a in FIG. 3 to 56b in FIG. 4 (the abscissa values of points 156a and 156b in FIG. 5), during the second stage, the wave numbers vary from 2000 to 1000 cm¹¹, or only at half the first-stage rate. In other words the slope of the second line 116 is one-half the slope of the first-stage line 106. The second or slower rotation stage 116 line is extended to the upper right as dotted line 116' merely to indicate how the diffracted radiation wave numbers would be generated if the scanning arm were always pivoted about the main pivot pin 60. Point 156b on line 116 of course generally corresponds to the position of the driving pin shown at 56b in FIG. 4; and point 156c corresponds to the dotted line position of this pin at 56c in the same figure, and represents the lowest wave number (approximately 650) actually used by the constructed embodiment of the invention. Of course scanning could be continued beyond point 156c to the theoretical limiting value indicated at 156d in FIG. 5 (corresponding to drive pin position 56d in FIG. 4) along the dotted extension of line 116 (at the lower left of FIG. 5).

As previously stated the exemplary embodiment shown in FIGS. 1—4, although fairly precisely indicating the relative movements of parts, is not drawn strictly to scale, and only roughly corresponds to the proportional dimensions of the actually built embodiment (having an exact 2:1 ratio of $B:A$) the functioning of which is shown in the graph of FIG. 5. The actually constructed embodiment had a scanning arm and lever corresponding at least approximately to that shown at 66 and 62 respectively, and the scanning arm 66 directly carried the reflective diffraction grating in a position at least analogous to that shown at 68. The driving pin (corresponding to 56) was driven in a linear manner by similar means, differing mainly only in details relative to the illustrated drive. However, the constructed embodiment had the diffraction grating depending from the scanning arm (rather than above it as shown in the instant drawings) and all of the elements were actually on the opposite side of the scanning arm 66 than indicated in the drawings. In particular FIG. 2 would roughly approximate the constructed embodiment if it were turned upside down (and also reversed left to right as in a plane mirror). Because of this upside down nature, the spider element (corresponding to 36) actually bearing the driving pin 56 slidingly engaged and depended from a pair of spaced parallel bars (rather than riding on tracks). The exemplary embodiment has been illustrated in this relative inverted manner, since the more usual, upright position of the optical element (68) is believed to simplify understanding of the drawings.

Thus the invention (in the particular environment of the exemplary embodiment) will initially cause the optical dispersion element 68 to rotate according to a first cosecant function so as to cause the output of the monochromator of which it is a part to yield monochromatic radiation of a frequency (as measured in wave numbers) linearly decreasing at a first rate. After completion of a certain wave number range (e.g., between 4,000 and 2,000 cm¹¹) the mechanism changes over automatically to a different linear rate (i.e., at the position shown in FIG. 3 as is indicated at point 156a in FIG. 5). This second rate will cause the grating rotation angle to follow a different cosecant function, which causes the radiation wave numbers to decrease at a second (lesser) linear rate (which in the specific embodiment is one-half of the first linear rate). It is again noted that lever 62b and therefore the pivot (64) between the scanning arm and the lever (which is the effective pivot during the first stage) will be moved out of the way (see FIG. 4) so that the second-stage slower speed scanning can continue beyond the point at which the driving pin 56b would otherwise contact both the lever 62 and the pivot pin 64 (if they were to remain in their first-stage position; compare FIG. 3). In the exact 2:1 ratio (of $B:A$) embodiment, the functioning of which is graphically shown in FIG. 5, the drive pin would pass through the original first-stage (see either FIG. 1 or 3) position of the pivot pin 64 at the point 156b (since this point has an abscissa value, $x$, corresponding to $x_1=0$).

Arrangements of the general type shown in FIGS. 1—4 (in which one of the pivot axes, 64, is caused to move out of the way during the stage in which it is inactive) have several practical advantages. First the assembly (i.e., elements 60—66) may be more compact than otherwise would be possible. Secondly the rotated element (i.e., grating 68) may be readily positioned on arm 66 between the two pivot axes (60 and 64), which causes the undesirable lateral movement of the grating during the first stage (compare FIG. 3 to FIG. 1) to be substantially counteracted by opposite lateral movement in the second rotation stage (compare FIG. 4 to FIG. 3). The fact that the two pivot axes are on opposite sides of the grating therefore reduces the size of the ruled surface of the grating required to intercept all of a given diameter optical beam throughout the entire scanning operation. These two features relating to the compound lever system of elements 62 and 66 and their pivot axes 60, 64 are additional advantages of the illustrated embodiment, but may be obtained by lever systems different from the specific type disclosed.

Although the invention has been disclosed in conjunction with a specific environment for the purpose of rotating an optical dispersion element at two different cosecant rates, the invention obviously may be utilized not only to rotate different types of optical elements, but also to cause rotation (or other movement) of elements according to other functions. For example, the scanning arm 66 may be connected to other types of linkages which inturn are connected to the element to be moved, thereby ultimately moving the final element according to two different other mathematical relationships. Additionally by modifying the geometry of the main driving elements (i.e., driving pin 56 and the internal cam edge 82) relative to the two pivot pins (60 and 64), the scanning arm 66 can itself be moved according to a trigonometric function other than a cosecant. Thus in its broader aspects the invention provides a means and technique for causing motion of an element (e.g., 68) which is directly or indirectly connected to a main arm (66), first according to one function and then (beyond a changeover point) automatically according to a second related function. Since various uses and modifications of the invention will be obvious to one skilled in the art beyond those explicitly mentioned, the invention is not limited to use in even these modifications. Obviously, many of the structural details of the exemplary embodiment also may be changed. Therefore the invention is not limited to any specific use or details hereinbefore described and illustrated; rather, the invention is defined solely by the scope of the appended claims.

I claim:

1. A drive for moving a driven optical element having radiation-modifying properties at at least two different but mathematically related rates comprising:

a scanning arm operatively connected to said optical element, and including a cam edge;

a driving member drivingly engaging said cam edge of said scanning arm;

motive means for continuously moving said driving member along said cam edge;

said scanning arm being rotatable about a first pivot axis when said driving member engages a certain first portion of said cam edge, and about a different second pivot axis when said driving member engages a second portion of said cam edge;

an auxiliary lever carrying a first pivot means, said first pivot means and supporting said scanning arm;

a second pivot means; said auxiliary lever being pivotally supported by said second pivot means;

means for causing said first pivot means to be the effective first pivot axis of said scanning arm when said driving member engages said first cam edge portion;

means rigidly blocking said scanning arm from further rotation relative to said auxiliary lever in one rotative sense when said driving member reaches the end of said first cam edge portion, said scanning arm therefore having been driven to a particular angular relationship relative to said lever;

said scanning arm and said auxiliary lever therefore being constrained to rotate conjointly about said second pivot means when said driving member engages said second cam edge portion, so that said second pivot means then defines said second pivot axis;

whereby said driven optical element moves as a first function of the movement of said driving member while it engages said first cam edge portion, and said driven optical element moves as a second mathematically related function of the movement of said driving member when it engages said second cam edge portion of said scanning arm.

2. A drive for an optical element according to claim 1, in which:
said optical element is an optical dispersion element.

3. A drive for an optical element according to claim 1, in which:
said optical dispersion element is a diffraction grating.

4. A rotary drive for a driven optical element according to claim 1, in which:
said first and second cam edge portions of said scanning arm are both substantially straight edges,
whereby said scanning arm moves as first and second trigonometric functions of said driving member movement.

5. A drive for a driven optical element according to claim 4, in which:
said driving member and said motive means therefore are of such construction that said driving member moves at a constant linear rate along a straight line path which extends along a direction toward whichever of said first and second pivot axes is then the effective rotation axis of said scanning arm,
whereby said scanning arm rotates according to a first cosecant function of said driving member movement when said driving member engages said first straight cam edge portion and said scanning arm rotates according to a second cosecant function of said driving member movement when said driving member engages said second straight cam edge portion.

6. A drive for a driven optical element according to claim 1, in which:
said first and second cam edge portions physically smoothly intersect so as to form a continuous smooth cam edge, whereby said driving member may directly pass from said first cam edge portion to said second cam edge portion without any assistance from auxiliary shifting and adjusting mechanisms.

7. A drive for a driven optical element according to claim 6, in which:
said first and second cam edge portions form parts of the same straight line,
whereby said driving member may pass from said first to said second cam edge portion without encountering any additional retarding force.

8. A drive for a driven optical element according to claim 1, in which:
said driving member and said motive means therefore are of such construction that said driving member moves at a constant linear rate,
thereby simplifying said motive means and its mechanical drive connection to said driving member.

9. A drive for a driven optical element according to claim 1, in which:
said driving member and said motive means therefore are of such construction that said driving member moves along a path extending through the original position of said lever-carried first pivot means,
the structural relationship between said second pivot means, said auxiliary lever, and said second cam edge portion of said scanning arm being such that the conjoint motion of said auxiliary lever, when said driving member is engaging said second cam edge portion, causes said first lever-carried pivot means to be moved out of the driving member path before said driving member reaches the original position of said first pivot means,
thereby increasing the useful path length of said driving member movement.

10. A drive for a driven optical element according to claim 1, in which:
said blocking means comprises a simple pin and slot connection between said scanning arm and said auxiliary lever.

11. A drive for a driven optical element according to claim 1, in which:
said driven optical element is rigidly and directly connected to said scanning arm so as to be directly rotated therewith.

12. A drive for a driven optical element according to claim 11, in which:
said driven optical element is positioned on said scanning arm effectively between said first and said second pivot axes,
whereby the total net range of undesired lateral movement of said driven element during its rotation is minimized.